(12) United States Patent
Johnson et al.

(10) Patent No.: US 10,746,101 B2
(45) Date of Patent: Aug. 18, 2020

(54) ANNULAR FUEL MANIFOLD WITH A DEFLECTOR

(71) Applicant: General Electric Company, Schenectady, NY (US)

(72) Inventors: Thomas Edward Johnson, Greer, SC (US); Kaitlin Marie Graham, Greenville, SC (US); Geoffrey David Myers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 397 days.

(21) Appl. No.: 15/621,367

(22) Filed: Jun. 13, 2017

(65) Prior Publication Data

US 2018/0356098 A1    Dec. 13, 2018

(51) Int. Cl.
*F02C 7/22* (2006.01)
*F23R 3/28* (2006.01)
*F23R 3/34* (2006.01)
*F23R 3/46* (2006.01)

(52) U.S. Cl.
CPC .............. *F02C 7/222* (2013.01); *F23R 3/286* (2013.01); *F23R 3/283* (2013.01); *F23R 3/343* (2013.01); *F23R 3/46* (2013.01)

(58) Field of Classification Search
CPC ...... F02C 7/222; F02C 3/24; F05D 2260/205; F23R 2900/03343; F23R 3/343; F23R 3/286; F23R 3/283; F23R 3/28
See application file for complete search history.

(56) References Cited

U.S. PATENT DOCUMENTS

| | | | |
|---|---|---|---|
| 3,775,975 A | 12/1973 | Stenger et al. | |
| 3,866,413 A | 2/1975 | Sturgess | |
| 5,359,847 A | 11/1994 | Pillsbury et al. | |
| 6,898,938 B2 * | 5/2005 | Mancini | F23D 11/107 60/740 |
| 9,366,442 B2 * | 6/2016 | Matsuyama | F23R 3/343 |
| 2009/0277176 A1 * | 11/2009 | Caples | F02C 7/222 60/737 |
| 2012/0305086 A1 | 12/2012 | Zhang et al. | |
| 2014/0116054 A1 * | 5/2014 | Means | F23R 3/283 60/739 |

* cited by examiner

*Primary Examiner* — Andrew H Nguyen
*Assistant Examiner* — Stephanie Cheng
(74) *Attorney, Agent, or Firm* — Dority & Manning, P.A.

(57) ABSTRACT

An annular fuel manifold includes an annular fuel plenum defined within the annular fuel manifold, an axial inlet into the annular fuel plenum, and a deflector downstream of the axial inlet, the deflector oriented such that fluid flow into the annular fuel plenum from the axial inlet is deflected by the deflector at least partially along a circumference of the annular fuel plenum.

12 Claims, 7 Drawing Sheets

ANNULAR FUEL MANIFOLD WITH A DEFLECTOR

FIELD

The present disclosure generally involves a fuel manifold. More specifically, the disclosure relates to a fuel manifold which promotes circulation of liquid fuel within the fuel manifold.

BACKGROUND

Gas turbines generally operate by combusting a fuel and air mixture in one or more combustors to create a high-energy combustion gas that passes through a turbine, thereby causing a turbine rotor shaft to rotate. The rotational energy of the rotor shaft may be converted to electrical energy via a generator coupled to the rotor shaft. Each combustor generally includes fuel nozzles that provide for premixing of the fuel and air upstream of a combustion zone, as a means to keep nitrogen oxide (NOx) emissions low.

Gaseous fuels, such as natural gas, often are employed as a combustible fluid in gas turbine engines used to generate electricity. In some instances, it may be desirable for the combustion system to be able to combust liquid fuels, such as distillate oil. In some configurations, liquid fuel may be provided to an annular fuel manifold and may circulate through the annular fuel manifold, e.g., along a circumference of the annular fuel manifold. Liquid fuel flowing through the various portions of a fuel nozzle may be exposed to relatively high temperatures. So long as the liquid fuel moves quickly enough through the fuel nozzle, the liquid fuel may provide advantageous cooling to the fuel system. However, if the liquid fuel moves too slowly and/or becomes stagnant, the high temperatures may adversely affect the liquid fuel.

BRIEF DESCRIPTION

Aspects and advantages are set forth below in the following description, or may be obvious from the description, or may be learned through practice.

According to one embodiment of the present disclosure, an annular fuel manifold is provided. The annular fuel manifold includes an annular fuel plenum defined within the annular fuel manifold, an axial inlet into the annular fuel plenum, and a deflector downstream of the axial inlet, the deflector oriented such that fluid flow into the annular fuel plenum from the axial inlet is deflected by the deflector at least partially along a circumference of the annular fuel plenum.

According to another embodiment of the present disclosure, a fuel nozzle for a combustor of a turbomachine is provided. The fuel nozzle includes a liquid fuel supply conduit connected to a source of liquid fuel and an annular fuel manifold. The liquid fuel supply is connected to an axial inlet of the annular fuel manifold and is in fluid communication with an annular fuel plenum defined within the annular fuel manifold via the axial inlet. The annular fuel manifold also includes a deflector downstream of the axial inlet. The deflector is oriented such that liquid fuel flow into the annular fuel plenum from the axial inlet is deflected at least partially along the circumference of the annular fuel plenum.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a fuel nozzle assembly for a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Figure 1:
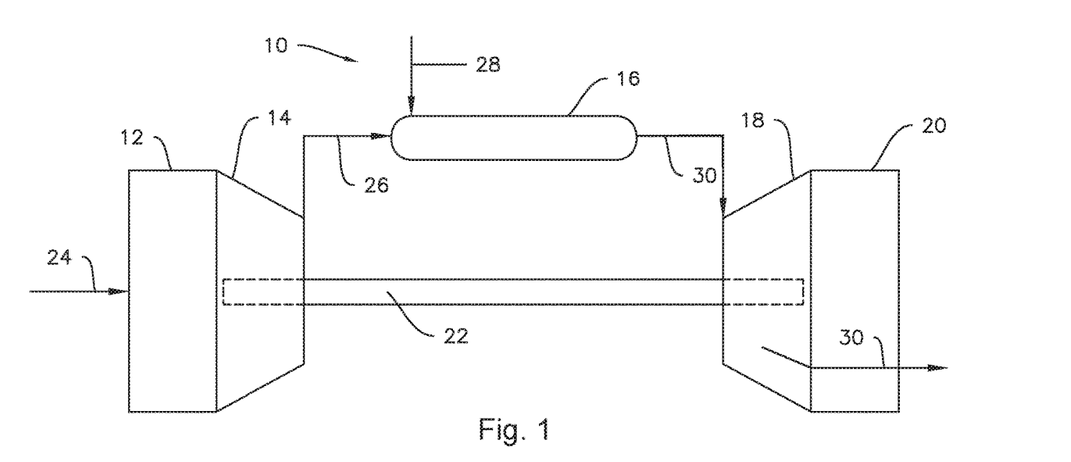
FIG. 1 is a functional block diagram of an exemplary gas turbine that may incorporate various embodiments of the present disclosure.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
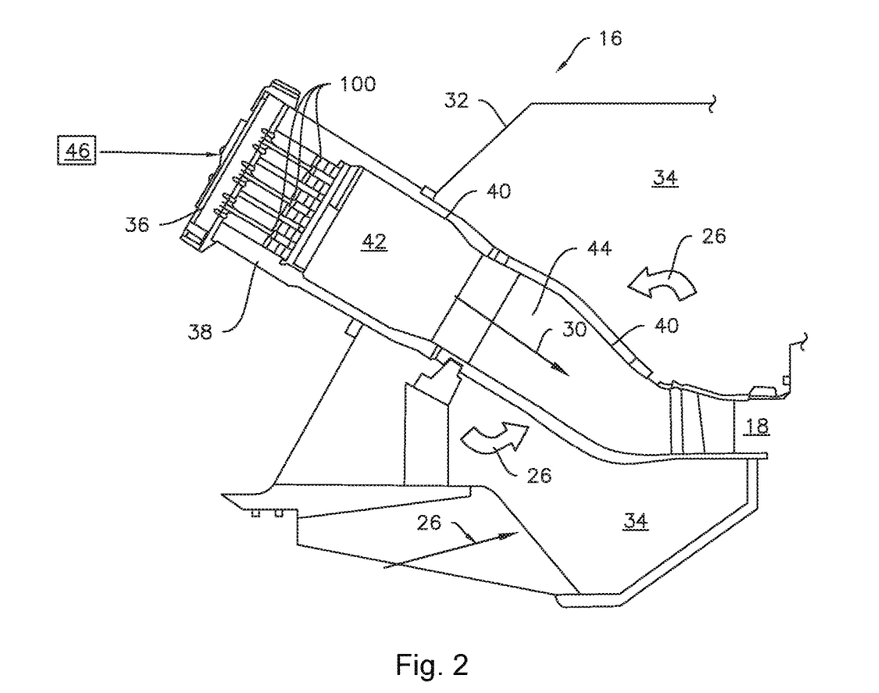
FIG. 2 is a simplified side section view of an exemplary combustor as may incorporate various embodiments of the present disclosure.

As shown in FIG. 2, the combustor 16 may be at least partially surrounded by an outer casing 32 such as a compressor discharge casing. The outer casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. An end cover 36 may be coupled to the outer casing 32. In particular embodiments, the outer casing 32 and the end cover 36 may at least partially define a head end volume or portion 38 of the combustor 16.

In particular embodiments, the head end portion 38 is in fluid communication with the high pressure plenum 34 and/or the compressor 14. One or more liners or ducts 40 may at least partially define a combustion chamber or zone 42 for combusting the fuel-air mixture and/or may at least partially define a hot gas path 44 through the combustor, for directing the combustion gases 30 towards an inlet to the turbine 18.

In various embodiments, the combustor 16 includes at least one fuel nozzle 100. As shown in FIG. 2, the fuel nozzle 100 may be coupled to the end cover 36 and extend towards the combustion chamber 42. The one or more fuel nozzles 100 may be in fluid communication with a liquid fuel supply 46. Various embodiments of the combustor 16 may include different numbers and arrangements of fuel nozzles 100 and is not limited to any particular number of fuel nozzles unless otherwise specified in the claims. For example, in particular configurations the one or more fuel nozzles 100 may include multiple fuel nozzles annularly arranged about a center fuel nozzle.

Figure 3:
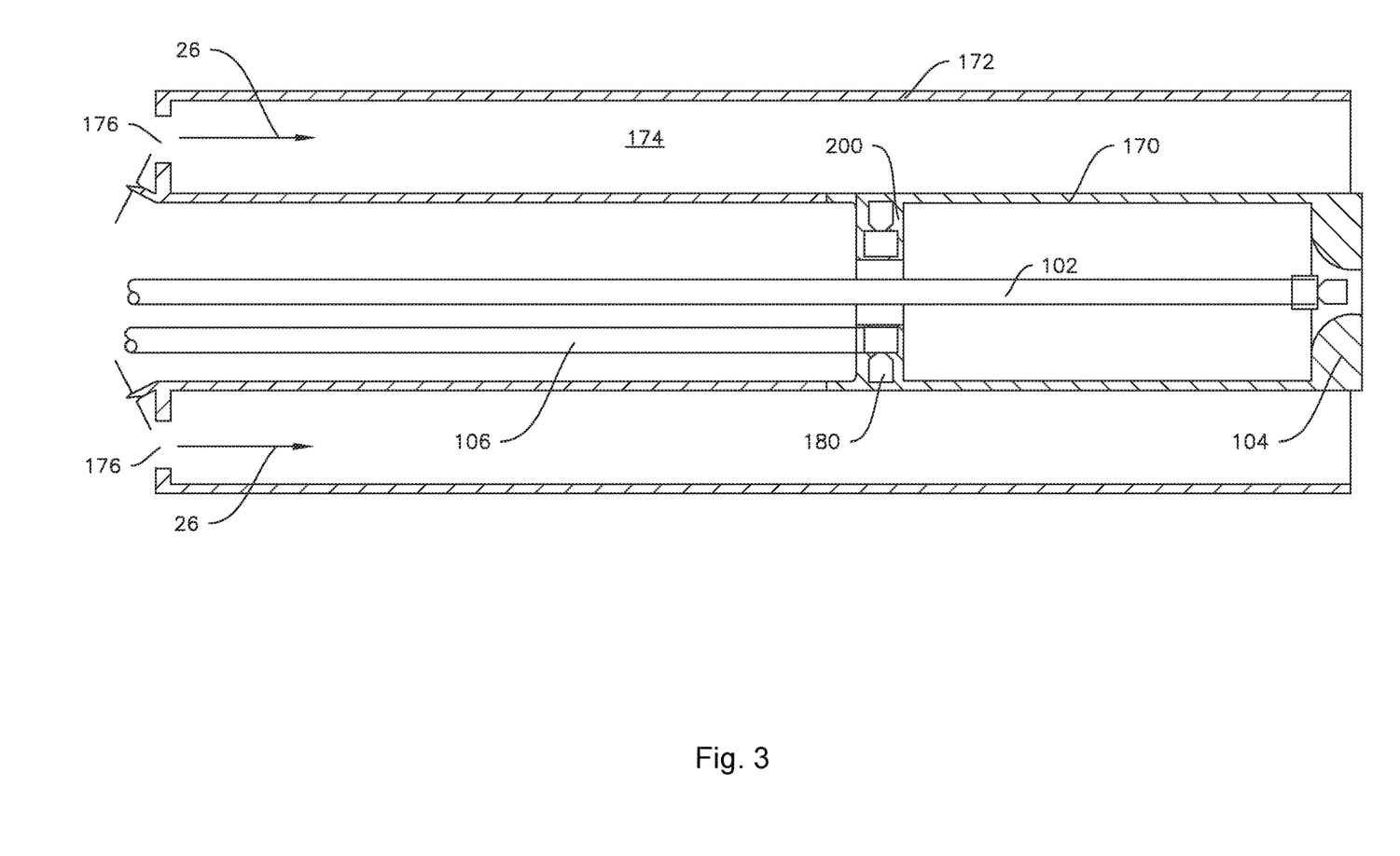
FIG. 3 is a side section view of a portion of a fuel nozzle as may incorporate various embodiments of the present disclosure.

FIG. 3 illustrates a portion of a fuel nozzle 100 as may incorporate various embodiments of the present disclosure. As shown in FIG. 3, the fuel nozzle 100 includes a center tube 170. In particular embodiments, the fuel nozzle 100 may include an outer sleeve or burner tube 172 that extends circumferentially around at least a portion of the center tube 170. An air plenum 174 is defined between the center tube 170 and the outer sleeve 172. In particular embodiments, the outer sleeve 172 may include one or more inlets 176 through which compressed air 26 may flow into the air plenum 174.

As illustrated for example in FIG. 3, some embodiments may include one or more fuel supply conduits, such as liquid fuel supply conduits 102 and 106. For example, a pilot liquid fuel supply conduit 102 may provide liquid fuel to a pilot tip 104 of the fuel nozzle 100. For example, the pilot tip 104 may be disposed at a downstream end of the center tube 170. A main liquid fuel supply conduit 106 may be connected to a source of liquid fuel, such as liquid fuel supply 46 (FIG. 2). The main liquid fuel supply conduit 106 may be connected to an axial inlet 202 (see, e.g., FIG. 4) of an annular fuel manifold 200. For example, the annular fuel manifold 200 may be upstream of the pilot tip 104 within the center tube 170. As indicated in FIG. 4, the annular fuel manifold 200 defines an axial direction A, a circumferential direction C, and a radial direction R.

Figure 4:
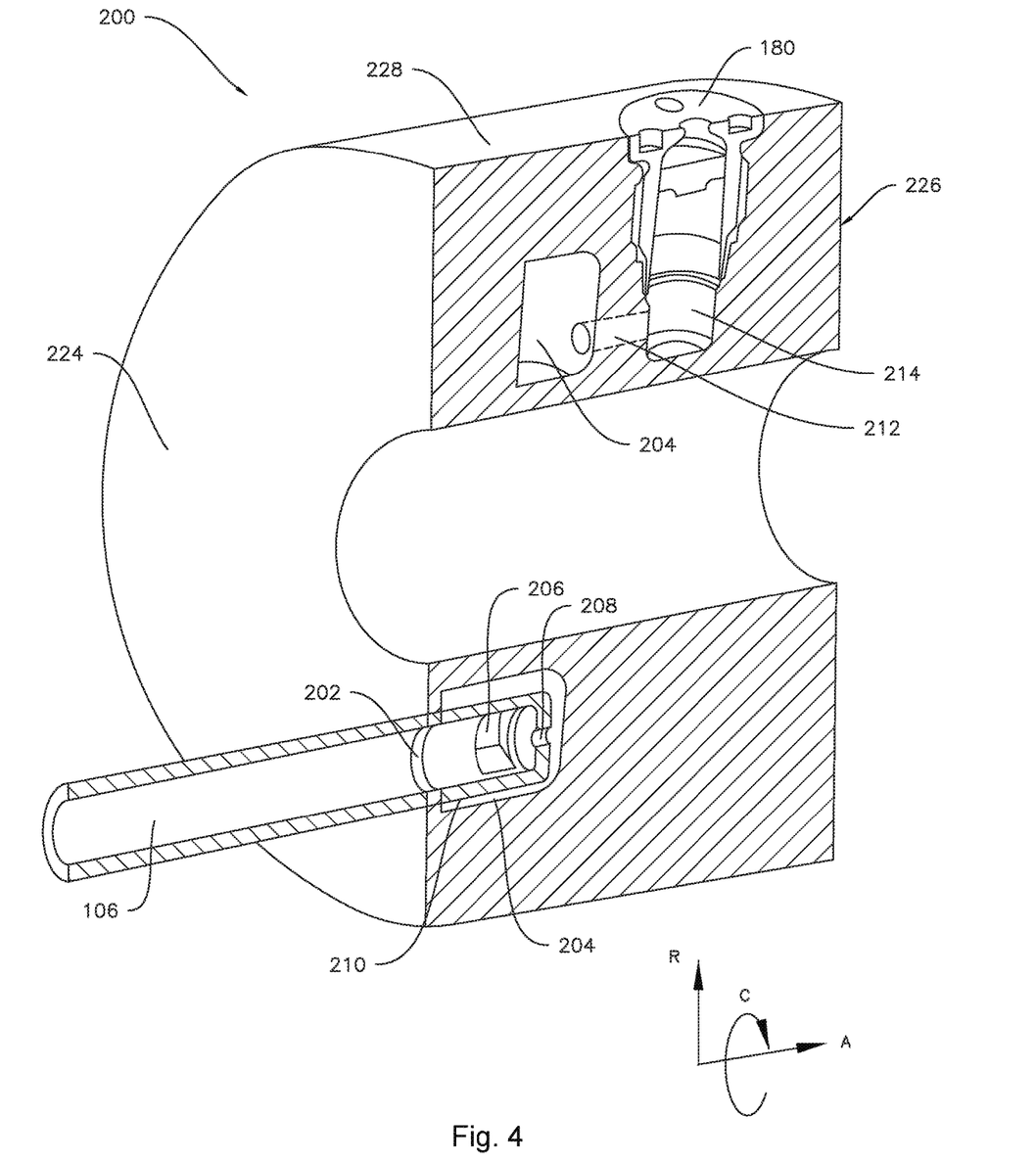
FIG. 4 is a partially sectioned perspective view of a fuel manifold according to at least one embodiment of the present disclosure.

As shown for example in FIG. 4, the annular fuel manifold 200 includes an annular fuel plenum 204 defined within the annular fuel manifold 200. As illustrated, the liquid fuel supply conduit 106 may be connected to an axial inlet 202 of the fuel manifold 200 and thereby the liquid fuel supply conduit 106 may be in fluid communication with the annular fuel plenum 204 via the axial inlet 202.

The annular fuel manifold 200 may be in fluid communication with the air plenum 174 for mixing liquid fuel from the main liquid fuel supply conduit 106 with air 26 in the air plenum 174. The fuel manifold 200 may include a plurality of radially outwardly oriented outlets 214 for spraying liquid fuel from the annular fuel plenum 204 into the air plenum 174. The outlets 214 may include nozzles, e.g., atomizers 180, therein for directing or otherwise controlling the flow of fuel into the air plenum 174. For example, as illustrated in FIG. 4, the annular fuel manifold 200 may include a forward wall 224 and an aft wall 226 axially spaced from the forward wall 224. The annular fuel manifold 200 may further include a cylindrical outer surface 228 extending between the forward wall 224 and the aft wall 226. Accordingly, the plurality of radial outlets 214 may be circumferentially arranged along the cylindrical outer surface 228. Further, by way of example, each of the plurality of radial outlets 214 may include an atomizer 180 in fluid communication with the air plenum 174 for spraying atomized liquid fuel from the annular fuel plenum 204 into the air plenum 174. In some embodiments, the radial outlets 214 may be in direct fluid communication with the annular fuel plenum 204. In other embodiments, for example, as illustrated in FIG. 4, the annular fuel manifold 200 may further include an axial conduit 212 between the annular fuel plenum 204 and each radial outlet 214 the plurality of radial outlets 214.

As shown in FIGS. 4 through 11, in various embodiments, the annular fuel manifold 200 includes a deflector downstream of the axial inlet 202. The deflector may be circumferentially oriented, e.g., oriented along the circumferential direction C, such that liquid fuel flow F (FIG. 8) into the annular fuel plenum 204 from the axial inlet 202 is deflected along the circumference of the annular fuel plenum 204, e.g., along the circumferential direction C.

In some embodiments, for example as illustrated in FIG. 4, the deflector may include a deflector cap 210 positioned on a downstream side of the axial inlet 202. As illustrated, the deflector cap 210 may include a circumferentially oriented aperture 206 for directing fluid flow from the inlet 202 along the circumference of the annular fuel plenum 204. In some embodiments, the deflector cap 210 may also include an axially oriented aperture 208. As illustrated in FIG. 4, in such embodiments where the axially oriented aperture 208 is provided, the circumferentially oriented aperture 206 may advantageously be much larger than the axially oriented aperture 208 such that a substantial majority of the fluid flow is diverted along the circumferential direction C.

Figure 5:
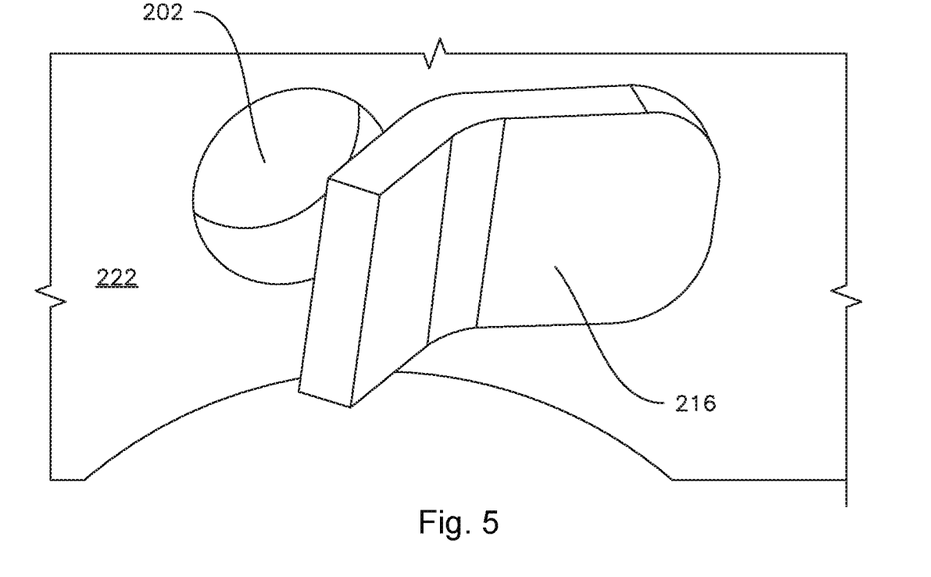
FIG. 5 is an enlarged perspective view of a portion of a fuel manifold according to at least one embodiment of the present disclosure.
Figure 6:
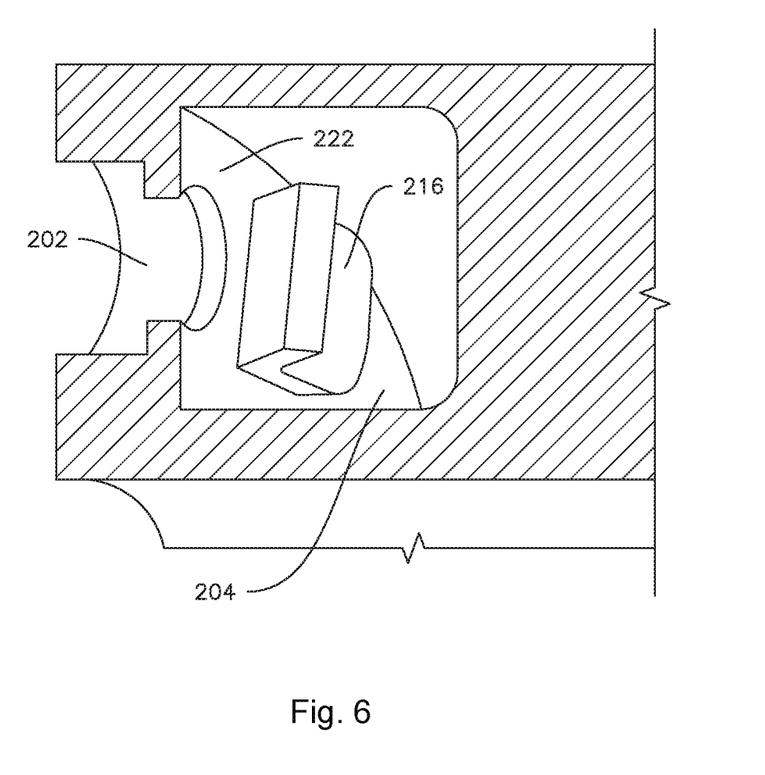
FIG. 6 is a side section view of the fuel manifold of FIG. 5.

As illustrated for example in FIGS. 5 and 6, example embodiments of the deflector may include a deflector tab 216. For example, the annular fuel manifold 200 may include a forward wall 224, with the axial inlet 202 into the fuel plenum 204 defined in the forward wall 224. The deflector may be a circumferentially oriented deflector tab 216 positioned on an internal side 222 of the forward wall 224 of the annular fuel manifold 200 proximate to the axial inlet 202.

Figure 7:
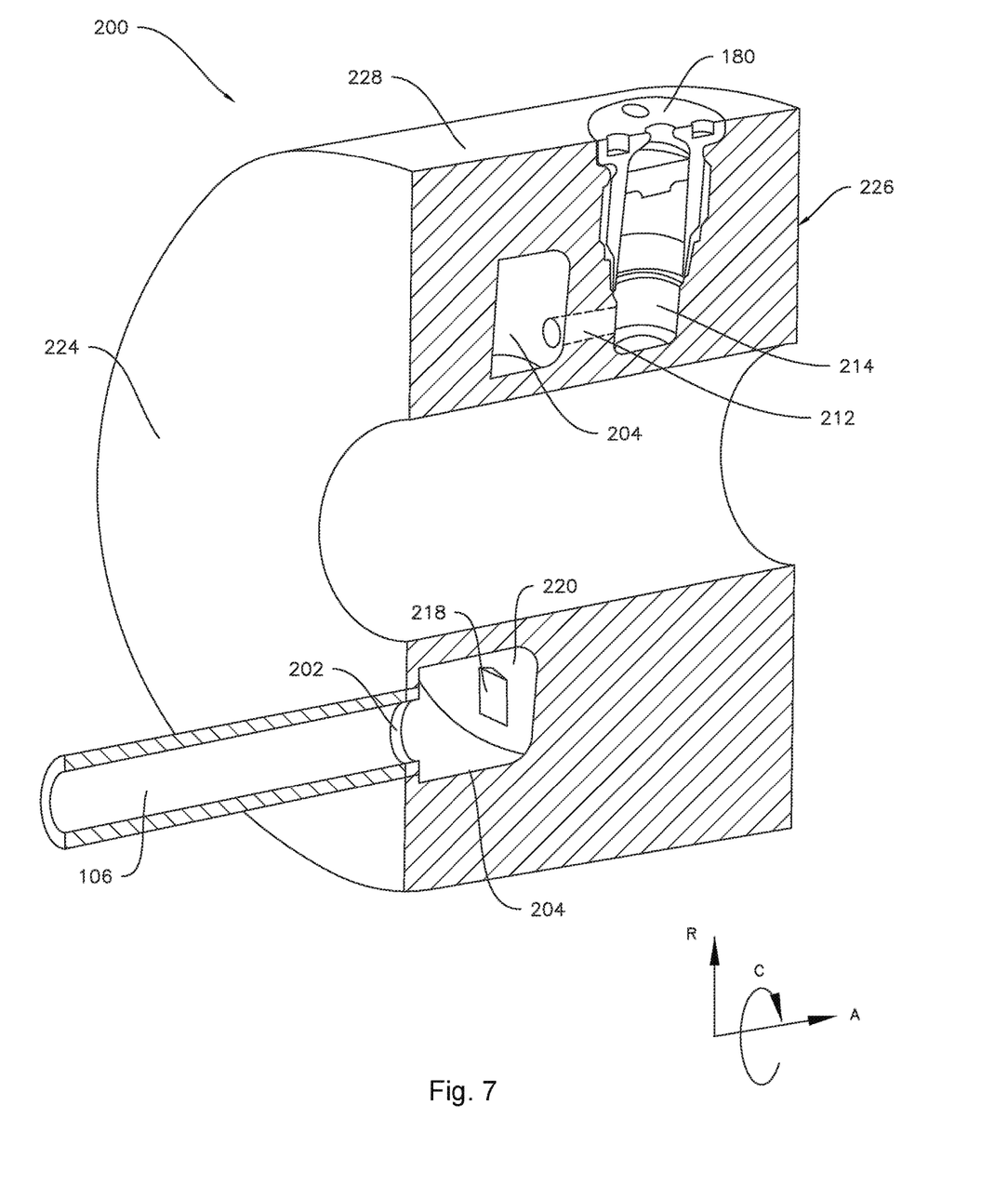
FIG. 7 is a partially sectioned perspective view of a fuel manifold according to at least one embodiment of the present disclosure.
Figure 8:
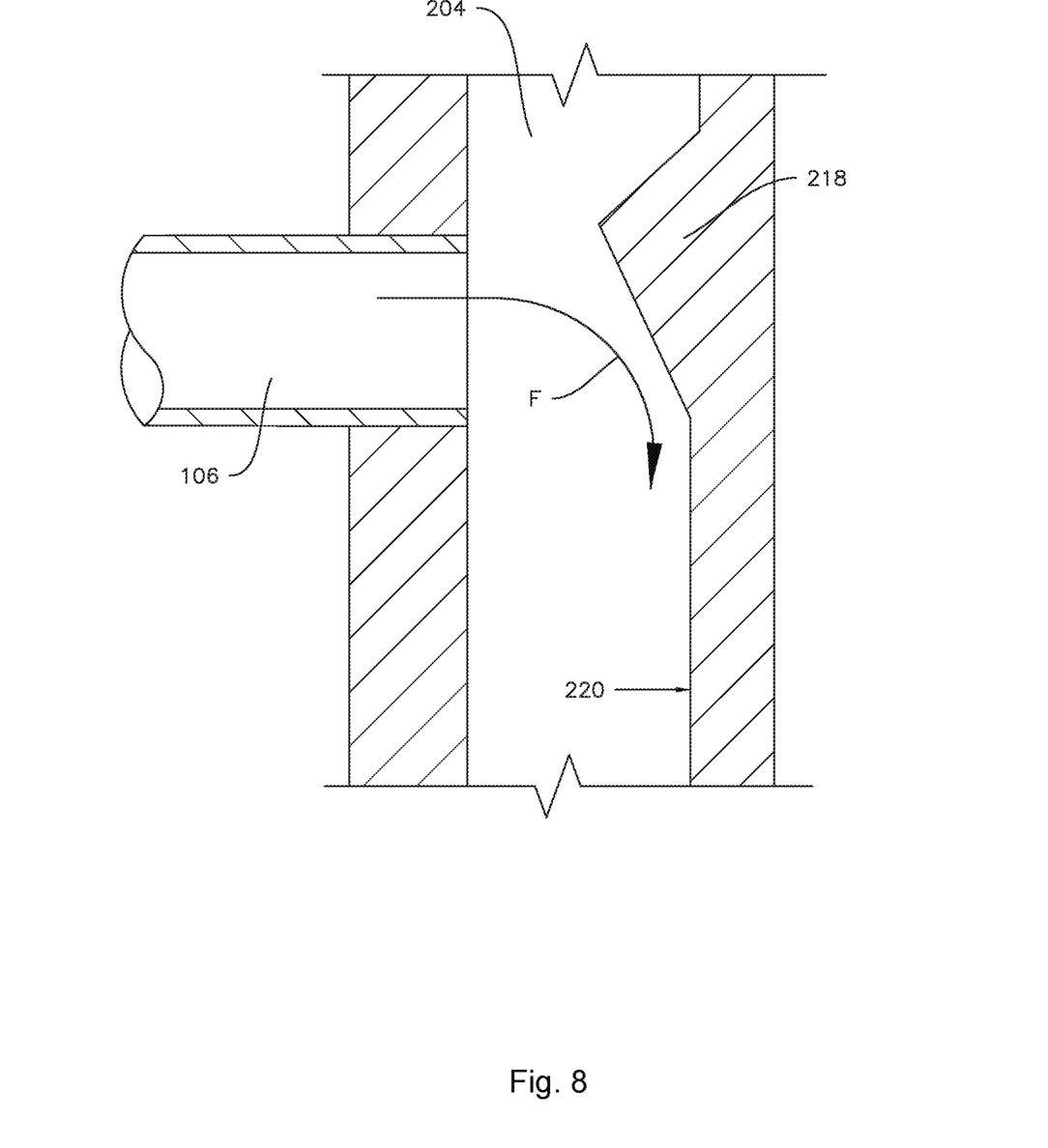
FIG. 8 is a top-down section view of a portion of the fuel manifold FIG. 7.

As illustrated for example in FIGS. 7 and 8, example embodiments of the deflector may include a circumferentially oriented deflector ramp 218. As illustrated, the annular fuel plenum 204 may include a radially oriented internal wall 220. Further, the circumferentially oriented deflector ramp 218 may be formed on the radially oriented internal wall 220 of the annular fuel plenum 204 opposite the axial inlet 202.

In some embodiments, the annular fuel manifold 200 may be formed of a single unitary piece, e.g., as illustrated in FIGS. 4 and 7. In other embodiments, the annular fuel manifold 200 may be formed of a plurality of distinct pieces which are separately formed and then joined together, e.g., with fasteners or by welding, brazing or other suitable methods of joining. For example, as may be seen in FIGS. 9 and 11, the annular fuel manifold 200 may include an annular insert 201 which is received in a portion of a main body 203. In some embodiments, the annular insert 201 may at least partially define the forward wall 224 of the annular fuel manifold 200 and may at least partially define the fuel plenum 204. In such embodiments, one or more deflectors, e.g., a deflector nipple 230, as illustrated in FIG. 11 and more fully described below, may be formed in or on the annular insert 201.

Figures 9, 10, 11:
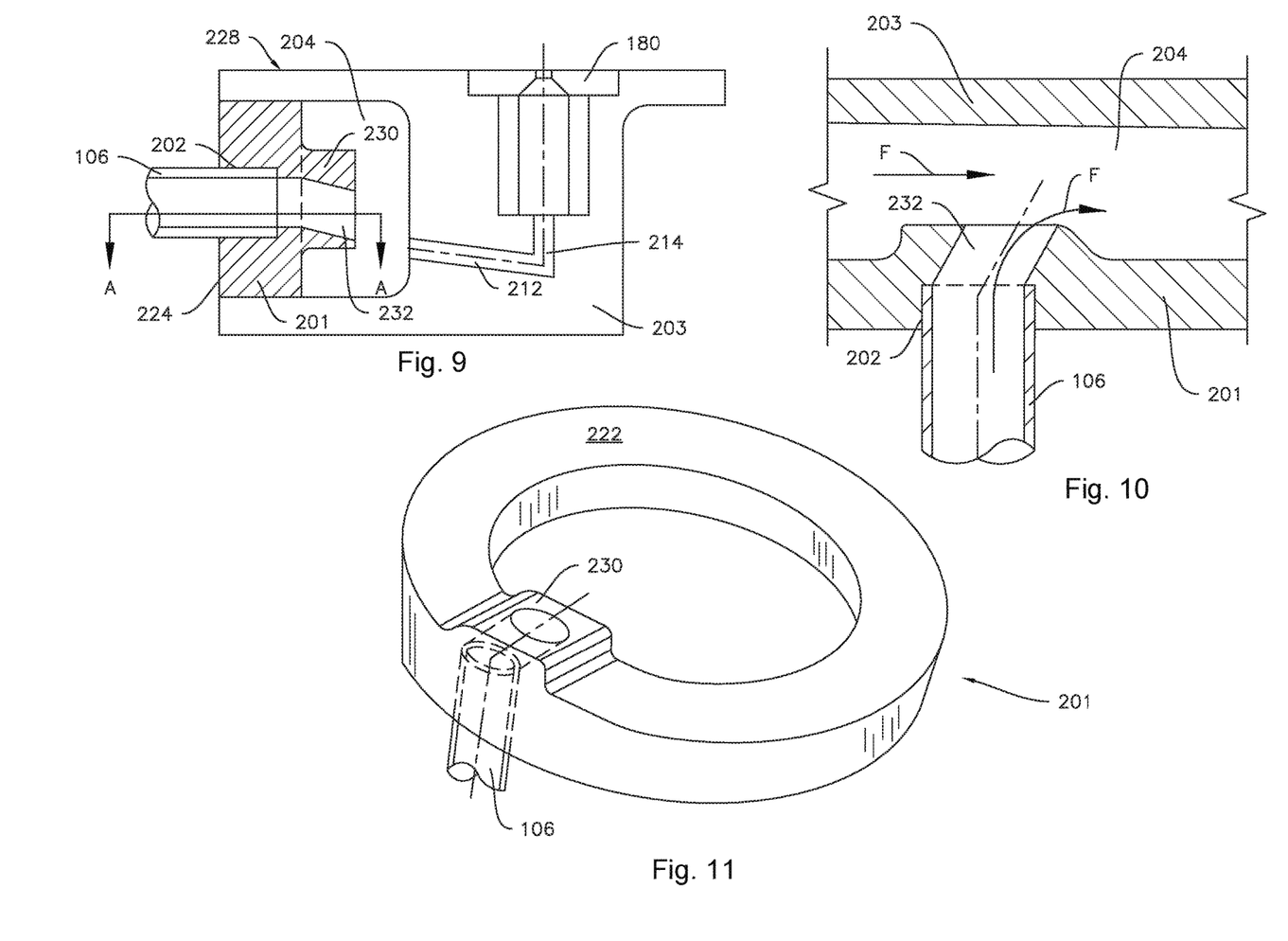
FIG. 9 is a side section view of a portion of a fuel manifold according to at least one embodiment of the present disclosure.
FIG. 10 is a radial section view of the fuel manifold of FIG. 9 taken along line A-A.
FIG. 11 is a perspective view of a portion of the fuel manifold of FIG. 9.

Embodiments of the deflector may include a deflector nipple 230, e.g., as illustrated in FIG. 9. For example, the deflector nipple 230 may be formed on internal side 222 of the forward wall 224 of the annular fuel manifold 200 in fluid communication with the axial inlet 202. As may be seen in FIG. 9, the deflector nipple 230 may include an oblique conduit 232, e.g., the oblique conduit 232 may be oriented at an oblique angle to the axial inlet 202. FIG. 10 is a section view of the fuel manifold of FIG. 9 taken along line A-A looking inward along the radial direction. As illustrated in FIGS. 9 and 10, the oblique conduit 232 of the deflector nipple 230 may be configured to urge the flow of fuel F circumferentially along the annular fuel manifold 204. In such embodiments, the oblique conduit 232 may extend partially along the circumferential direction C, such configuration of the oblique conduit 232 may advantageously promote swirling of the fuel F within the fuel manifold 204.

FIG. 11 provides a perspective view of an annular insert 201 which may, according to some exemplary embodiments, form a portion of the annular fuel manifold 200. In the particular example illustrated by FIG. 11, the annular insert 201 includes the inlet 202 (e.g., FIG. 9) and the deflector, which in this example is embodied as the deflector nipple 230. However, in other embodiments, the deflector nipple 230 and oblique conduit 232 may be integrally formed with a unitary one-piece annular fuel manifold. Further combinations are also possible, such as but not limited to the deflector cap 210 of FIG. 4 may be provided as the deflector on annular insert 201 instead of (or in addition to, e.g., in the case of multiple inlets as described below) the deflector nipple 230. Thus, it should be understood that any of the various embodiments of the deflector may be provided in a unitary fuel manifold or in a manifold comprising multiple distinct pieces joined together.

It is to be understood that the present disclosure is not limited to a single inlet 202 and a single liquid fuel supply conduit 106. For example, the axial inlet 202 may be a first axial inlet and the deflector may be a first deflector. In such example embodiments, the annular fuel manifold may further include a second axial inlet into the annular fuel plenum 204 and a second deflector downstream of the second axial inlet. In such embodiment, the second deflector may be circumferentially oriented such that fluid flow into the annular fuel plenum 204 from the second axial inlet is deflected by the second deflector along the circumferential direction C within the annular fuel plenum 204, as described above with respect to the various embodiments of the deflector. For example, embodiments of the second deflector may include any of the deflector cap 210, deflector tab 216, deflector 218, or deflector nipple 230, as described hereinabove. Further, each deflector embodiment may be combined with any other deflector embodiment, e.g., the first and second deflectors may each be a deflector cap 210, or one may be a deflector cap 210 while the other is a deflector ramp 218, etc. Moreover, embodiments of the present disclosure may include more than two inlets, each with an associated deflector. In embodiments where more than one deflector is provided, each deflector may advantageously be oriented to direct liquid fuel flow in the same direction, e.g., either clockwise or anti-clockwise along the circumferential direction C, as every other deflector.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An annular fuel manifold comprising:
   an annular fuel plenum defined within the annular fuel manifold;
   an axial inlet into the annular fuel plenum; and
   a deflector downstream of the axial inlet, the deflector oriented such that fluid flow into the annular fuel plenum from the axial inlet is deflected by the deflector at least partially along a circumferential direction defined by the annular fuel plenum;
   wherein the deflector comprises a deflector nipple downstream of the axial inlet, the deflector nipple defining an oblique conduit in fluid communication with the annular fuel manifold, the oblique conduit configured to direct fluid flow from the axial inlet partially along the circumferential direction.

2. The annular fuel manifold of claim 1, further comprising a forward wall, an aft wall axially spaced from the forward wall, and a cylindrical outer surface extending between the forward wall and the aft wall.

3. The annular fuel manifold of claim 2, further comprising a plurality of radial outlets circumferentially arranged along the cylindrical outer surface.

4. The annular fuel manifold of claim 3, further comprising an axial conduit between the annular fuel plenum and each radial outlet of the plurality of radial outlets.

5. The annular fuel manifold of claim 1, wherein the axial inlet is a first axial inlet and the deflector is a first deflector, further comprising a second axial inlet into the annular fuel plenum and a second deflector downstream of the second axial inlet, the second deflector circumferentially oriented such that fluid flow into the annular fuel plenum from the second axial inlet is deflected by the second deflector along the circumferential direction.

6. A fuel nozzle for a combustor of a turbomachine, comprising:
   a liquid fuel supply conduit connected to a source of liquid fuel;
   an annular fuel manifold, the liquid fuel supply conduit connected to an axial inlet of the annular fuel manifold and in fluid communication with an annular fuel plenum defined within the annular fuel manifold via the axial inlet, the annular fuel manifold further comprising a deflector downstream of the axial inlet, the deflector oriented such that liquid fuel flow into the annular fuel plenum from the axial inlet is deflected at least partially along a circumferential direction defined by the annular fuel plenum;
   wherein the deflector comprises a deflector nipple downstream of the axial inlet, the deflector nipple defining an oblique conduit in fluid communication with the annular fuel manifold, the oblique conduit configured to direct fluid flow from the axial inlet partially along the circumferential direction.

7. The fuel nozzle of claim 6, wherein the annular fuel manifold further comprises a forward wall, an aft wall axially spaced from the forward wall, and a cylindrical outer surface extending between the forward wall and the aft wall.

8. The fuel nozzle of claim 7, wherein the annular fuel manifold further comprises a plurality of radial outlets circumferentially arranged along the cylindrical outer surface.

9. The fuel nozzle of claim 8, wherein each of the plurality of radial outlets comprises an atomizer in fluid communication with an air plenum for spraying atomized liquid fuel from the annular fuel plenum into the air plenum.

10. The fuel nozzle of claim 8, wherein the annular fuel manifold further comprises an axial conduit between the annular fuel plenum and each radial outlet of the plurality of radial outlets.

11. The fuel nozzle of claim 6, wherein the axial inlet is a first axial inlet and the deflector is a first deflector, further comprising a second axial inlet into the annular fuel plenum and a second deflector downstream of the second axial inlet, the second deflector circumferentially oriented such that fluid flow into the annular fuel plenum from the second axial inlet is deflected by the second deflector along the circumferential direction.

12. The fuel nozzle of claim 6, further comprising a center tube, a pilot tip disposed at a downstream end of the center tube, the annular fuel plenum upstream of the pilot tip within the center tube, an outer sleeve that circumferentially surrounds at least a portion of the center tube, and an air plenum defined between the outer sleeve and the center tube.

* * * * *